US009483937B2

United States Patent
Todasco

(10) Patent No.: US 9,483,937 B2
(45) Date of Patent: Nov. 1, 2016

(54) WIRELESS BEACON DEVICES PROVIDING CROSSWALK MANAGEMENT THROUGH COMMUNICATION DEVICE CONNECTIONS

(71) Applicant: PayPal, Inc., San Jose, CA (US)

(72) Inventor: Michael Charles Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 20 days.

(21) Appl. No.: 14/516,389

(22) Filed: Oct. 16, 2014

(65) Prior Publication Data

US 2016/0110998 A1      Apr. 21, 2016

(51) Int. Cl.
| | |
|---|---|
| G08G 1/095 | (2006.01) |
| G08G 1/005 | (2006.01) |
| H04W 4/02 | (2009.01) |
| G08G 1/07 | (2006.01) |
| G08C 17/02 | (2006.01) |
| G08G 1/00 | (2006.01) |

(52) U.S. Cl.
CPC ............... *G08G 1/005* (2013.01); *G08C 17/02* (2013.01); *G08G 1/00* (2013.01); *G08G 1/07* (2013.01); *G08G 1/095* (2013.01); *H04W 4/02* (2013.01)

(58) Field of Classification Search
CPC .. G08G 1/005; G08G 1/095; F21W 2111/02; A61H 3/061; B61L 29/24
See application file for complete search history.

(56) References Cited

U.S. PATENT DOCUMENTS

| | | | | |
|---|---|---|---|---|
| 5,959,553 A | * | 9/1999 | Raswant | G08G 1/081 340/907 |
| 6,018,697 A | * | 1/2000 | Morimoto | G01C 21/34 340/988 |
| 6,731,940 B1 | * | 5/2004 | Nagendran | H04L 29/06 455/456.1 |

(Continued)

*Primary Examiner* — Quang D Pham
(74) *Attorney, Agent, or Firm* — Haynes and Boone, LLP

(57) ABSTRACT

There are provided systems and methods for wireless beacon devices providing crosswalk management through communication device connections. A user may travel with a device, such as a communication device, that includes a communication module that may utilize specialized hardware features to establish short range wireless communications with nearby wireless beacons. The wireless beacons may be established at or nearby crosswalk locations. The beacon may provide the aforementioned communication services with the communication device and be utilized to triangulate a position, path of travel, and speed of travel of the user. Calendar, travel route, and other information for the user may also be determined using the beacons. Thus, a crosswalk signal may be changed in anticipation of the user crossing. Further, if the user requires additional time to cross based on triangulating the user's location in the crosswalk, the signal may be further changed based on the user's location.

19 Claims, 5 Drawing Sheets

(56) References Cited

U.S. PATENT DOCUMENTS

| | | | |
|---|---|---|---|
| 8,786,466 B1* | 7/2014 | Aladas | G08G 1/005 340/906 |
| 9,142,127 B1* | 9/2015 | McDevitt-Pimbley | G08G 1/091 |
| 2002/0018004 A1* | 2/2002 | Raswant | G08G 1/095 340/907 |
| 2008/0074289 A1* | 3/2008 | Sauder | G08G 1/07 340/909 |
| 2008/0284616 A1* | 11/2008 | Rendon | G08G 1/07 340/907 |
| 2009/0146841 A1* | 6/2009 | Basson | G08G 1/07 340/925 |
| 2010/0191449 A1* | 7/2010 | Iwamoto | G08G 1/08 701/118 |
| 2011/0140924 A1* | 6/2011 | Sennett | G08C 17/02 340/944 |
| 2011/0187559 A1* | 8/2011 | Applebaum | B60Q 1/00 340/907 |
| 2011/0246055 A1* | 10/2011 | Huck | G01C 21/3484 701/533 |
| 2012/0223843 A1* | 9/2012 | Wall | G08G 1/095 340/944 |
| 2012/0239584 A1* | 9/2012 | Yariv | G01C 21/3438 705/319 |
| 2013/0027221 A1* | 1/2013 | Johnson | G08G 1/087 340/902 |
| 2013/0027704 A1* | 1/2013 | Davis | G08G 1/081 356/402 |
| 2013/0049990 A1* | 2/2013 | Shi | G08G 1/095 340/907 |
| 2013/0049993 A1* | 2/2013 | Shi | G08G 1/095 340/928 |
| 2013/0187792 A1* | 7/2013 | Egly | G08G 1/0965 340/901 |
| 2013/0226905 A1* | 8/2013 | Chamberlain | G06Q 10/047 707/722 |
| 2013/0275032 A1* | 10/2013 | Yorke | G08G 1/00 701/119 |
| 2014/0365107 A1* | 12/2014 | Dutta | G01C 21/343 701/408 |
| 2015/0345962 A1* | 12/2015 | Graham | G01C 21/343 701/430 |

* cited by examiner

US 9,483,937 B2

WIRELESS BEACON DEVICES PROVIDING CROSSWALK MANAGEMENT THROUGH COMMUNICATION DEVICE CONNECTIONS

TECHNICAL FIELD

The present application generally relates to wireless beacon devices providing crosswalk management through communication device connections and more specifically to utilizing wireless beacon devices near crosswalk intersections to regulate traffic crossing the crosswalk and travelling down the road corresponding to the crosswalk.

BACKGROUND

Users may bring mobile user devices with them as they travel, including communication devices. Such devices may have schedules of the user, travel routes, and other user information that may be used to determine where the user is travelling and when the user needs to arrive at a location. However, while travelling by foot or vehicle, crosswalk lights and/or stop lights may be unaware of the user's schedule, thus, may unnecessarily delay a user while they are trying to reach an endpoint. This is especially true in the case of crosswalks, where a user often is required to be physically present at the crosswalk to press a button. Thus, the user will nearly always incur some wait period when arriving at the crosswalk. Further, crosswalks usually allow for a set amount of time for users to cross the crosswalk after the button is pressed, which may be determined using the length of the crosswalk. Such set time amounts may consider the normal pace of a user, but may not consider users who may need additional time, or users who may accidentally step into the intersection and do not press the button (for example, young children). Thus, users may incur safety risks when utilizing crosswalks.

Figure 1:
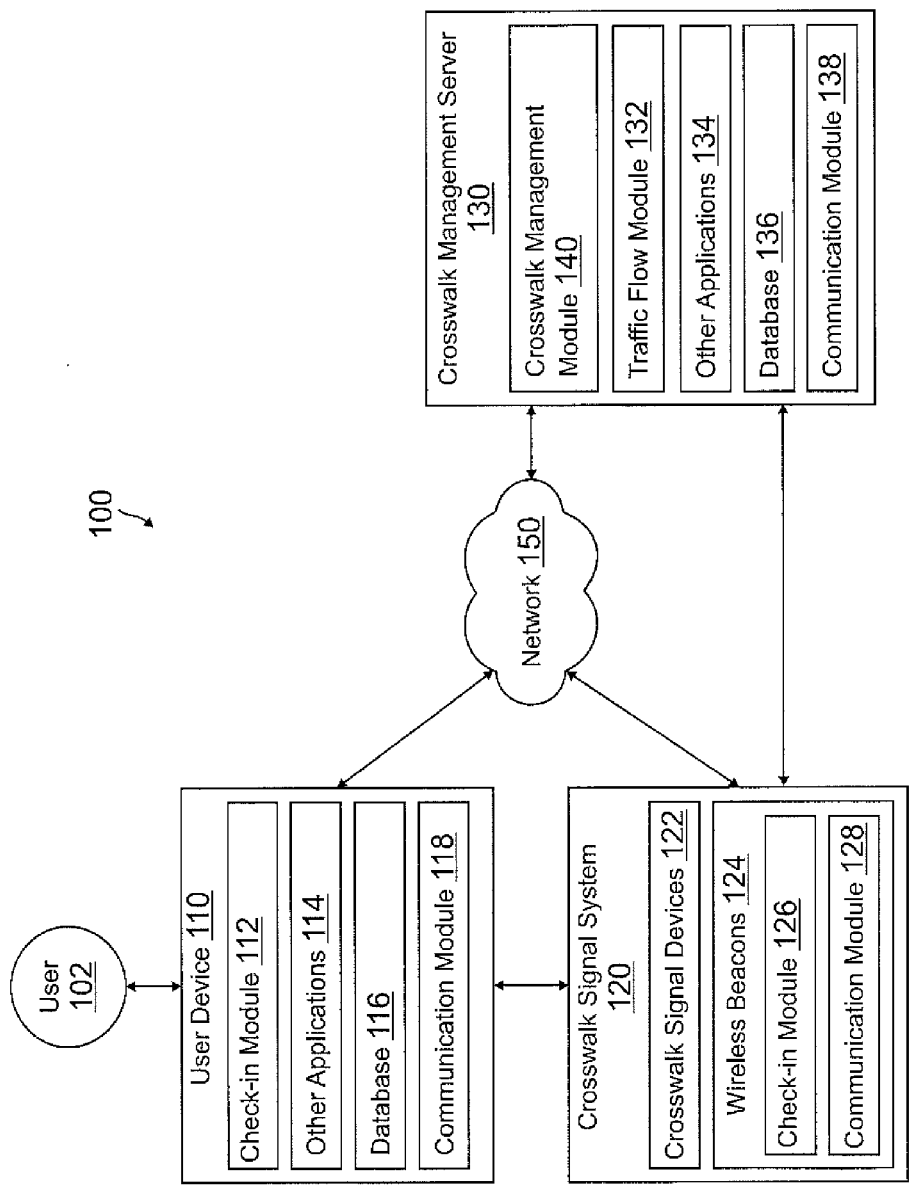
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized by wireless beacon devices to provide crosswalk management through communication device connections. Systems suitable for practicing methods of the present disclosure are also provided.

Various crosswalk locations may provide short range wireless communications with a communication device, such as through beacons using Bluetooth Low Energy (BLE), LTE Direct, or other communication protocol. These beacons may be set up at the crosswalk location, such as at or nearby the crosswalk and/or crosswalk signal, embedded in pavement below the crosswalk, attached to road signals above the crosswalk, and/or placed in or nearby sidewalks associated with the crosswalk. The beacons may communicate with devices in possession of users in order to connect to the device and determine the user is in proximity to the beacon. The beacons may provide additional functionality, such as establishing a connection with a crosswalk management device or server to provide the crosswalk management device/server notifications of where the user is detected. Thus, the beacons may provide proximity detection of users and triangulation of user's positions/locations nearby or within the crosswalk.

Thus, these beacons at the crosswalk location may communicate with the communication device in possession of the user through Bluetooth Low Energy (BLE), LTE Direct, or another communication protocol receivable by the communication device. When establishing a connection, the beacon may emit a communication signal including an identifier for the beacon, the user, and/or the crosswalk management service administering the beacons (e.g., a service provider, transportation provider, and/or town/city management). A check-in module of the communication device may execute specialized hardware and/or software to passively monitor for the short range wireless communications, for example, through a communication module. When the device detects the signal and verifies the one or more identifiers, both the device and the beacon may ramp up in power and establish a connection, where the connection may further enable the device to communicate additional information to the wireless beacon, such as check-in information (e.g., an identifier) and/or other stored data. The beacon may be connected to a networked device at the crosswalk location, or the beacon may include network functionality to communicate with other devices and/or servers itself.

Thus, the beacon enables the user device to establish a connection, communicate check-in information (e.g., an identifier for the user and/or user device), and/or complete a check-in with the crosswalk location. The check-in may be completed automatically when the user device is in range of the beacon, or may be completed after prompting the user to check-in when the user device is in range of the beacon. The wireless beacon(s) may be range limited to correspond to a sub-area of the crosswalk location, such as by limiting the signal strength and/or directionality of the beacon and/or utilizing the physical boundaries of the location. The sub-area may correspond to one side of the crosswalk, a center or other area within the crosswalk, a sidewalk preceding or after a crosswalk, or other area at or nearby a crosswalk. Thus, the communication device may connect to one beacon in a sub-area of the crosswalk location, multiple beacons in more than one sub-area of the crosswalk location, and/or one or more beacons corresponding to the entire crosswalk location.

Utilizing the one or more beacons the communication device is connected to, a location of the user and/or a path the user is travelling may be determined by a crosswalk management device/server in communication with the wireless beacon(s), such as whether the user will travel through the crosswalk or if the user is crossing a road at the crosswalk location. The crosswalk management server may receive the connection information from the wireless beacon(s) utilizing a communication module and store the connection information to a non-transitory memory of the crosswalk management device/server. A crosswalk management module may then determine the path/location using the connections between the communication device for the user and the wireless beacon(s). For example, the location and/or path of the user may be determined using the beacon(s) the user's communication device has connected to, triangulation of the user through the user's communication device connections with the beacon(s), and/or information available about the user from the communication device. Thus, once the user device connects to the beacon, information about the user device may be accessed, received, and/or retrieved by the wireless beacon. Such information may correspond to an identifier that associates the user's location with the beacon's location, or may also correspond to a travel route of the user, a calendar application having a schedule of the user (e.g., a meeting schedule and location of the meeting), and/or personal information about the user (e.g., a home, work, family, friend, and/or vacation address of the user, and age of the user, a handicap status of the user, items and/or associated users the user may be travelling with, etc.).

Thus, once the location of the user, the path of the user, and/or the personal information about the user is determined by the crosswalk management device/server using received information (e.g., the check-in information for the communication device's connections with one or more wireless beacons and additional information communicated to the wireless beacons from the communication device), the crosswalk management device/server may determine a setting for one or more crosswalk and/or road signal devices at the crosswalk for the user. Such setting may correspond to a change of the crosswalk light to allow the user to traverse the crosswalk, a red light to stop traffic travelling through the crosswalk (e.g., vehicle traffic), and/or an amount of time to allow the user to travel through the crosswalk. The amount of time to allow the user to travel through the crosswalk may be determined using personal information for the user, such as an age, handicap status, average walking speed, whether the user may be on or using a device for travel, such as a bicycle, skateboard, skates, tricycle, inline skates, and the like, along with average travel speeds and/or experience levels with such devices, and/or luggage/others (other humans and/or animals) with the user, including strollers, wagons, carts, etc. For example, an average walking speed of a user may be determined based on historic walking speeds known about the user and/or determined using the communication device of the user (for example, if the communication device includes a pedometer or other device to capture the walking speed. The walking speed may also be determined as the user approaches the crosswalk, such as through a speed detection device and/or wireless beacons at the crosswalk. The walking speed may also constitute a combination of elements, such as a historic walking speed and a current walking speed, for example, if the user is presently travelling 7 miles an hour but speeds up to 10 miles an hour in a crosswalk. The aforementioned walking speed may therefore determine how long a crosswalk signal may be required to allow passage for the user. Once the setting is determined, it may be transmitted to the signal device(s) at the crosswalk, which may utilize the setting to change the light for the user. The setting may be determined to change the light(s) when the user is detected at the entrance to the crosswalk, or may include a countdown timer to account for the time until the user arrives at the entrance to the crosswalk.

The setting may also be adjusted based on user actions and/or information about surrounding circumstances, such as traffic and/or street closures. For example, the user may correspond to a young child who runs into the crosswalk without waiting for the light to change. Thus, on detection of the child in the crosswalk, the lights may quickly or immediately change to provide safety to the young child. In other embodiments, the user may correspond to an elderly person who may take longer to cross the crosswalk. Thus, if the user is still detected in the crosswalk, the amount of time for the signal to allow the user to cross the crosswalk may be extended. In still further embodiments, traffic or street closures may route the users to certain crosswalks while preventing use of other crosswalks, or cause increased delay for certain crosswalks to alleviate vehicle traffic concerns. Moreover, the crosswalk management system may track user foot traffic utilizing the wireless beacons to determine traffic flows and other high traffic patterns. Such traffic patterns may be provided to nearby merchants, businesses, and/or service providers to assist such employers with business decisions.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a crosswalk signal system 120 having crosswalk signal devices and wireless beacons 124, and crosswalk management server 130 in communication over a network 150. User 102 may travel through a crosswalk location corresponding to crosswalk signal system 120, where crosswalk signal devices 122 control traffic throughout the crosswalk location and wireless beacons 124 connect with user device 110. User device 110 may connect to wireless beacons 124 in order to determine a location and/or path of travel for user 102. Crosswalk management server 130 may determine one or more settings, light changes, or other parameters for crosswalk signal devices 122 based on the connections between user device 110 and wireless beacons 124 and transmit the setting(s) to crosswalk signal system 120 for execution by crosswalk signal devices 122.

User device 110, crosswalk signal system 120, crosswalk signal devices 122, wireless beacons 124, and crosswalk management server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with wireless beacons 124 and/or crosswalk management server 130. For example, in one embodiment, user device 110 may be implemented as a personal computer (PC), a smart phone, laptop/tablet computer, wristwatch with appropriate computer hardware resources, eyeglasses with appropriate computer hardware (e.g. GOGGLE GLASS®), other type of wearable computing device, implantable communication devices, and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a check-in module 112, other applications 114, a database 116, and a communication module 118. Check-in module 112 and other applications 114 may correspond to executable processes, procedures, and/or applications with associated hardware. In other embodiments, user device 110 may include additional or different hardware and software as required.

Check-in module 112 may correspond to one or more processes to execute modules and associated devices of user device 110 to establish a connection with wireless beacons 124, including a check-in with a crosswalk location corresponding to crosswalk signal system 120. In this regard, check-in module 112 may correspond to specialized hardware and/or software utilized by user device 110 with wireless beacons 124 to establish a connection and complete a check-in in order to provide user 102 crosswalk management services. A connection by check-in module 112 with one or more of wireless beacons 124 may provide and/or verify the identity of user 102, including transmission of an identifier for user 102 and/or user device 110. Thus, check-in information may be established when a connection is made by check-in module 112 with one or more of wireless beacons 124 that includes one or more identifiers.

In various embodiments, check-in module 112 receives short range wireless communications from one or more of wireless beacons 124 through communication module 118 at a crosswalk location and transmits information to wireless beacons 124, including check-in information for a check-in process that associates user 102 with the one or more of wireless beacons 124 connected with user device 110. For example, wireless beacons 124 may be located at and throughout a crosswalk location (e.g., at crosswalk entrances and exits, within the crosswalk travelling path, and at or nearby sidewalks approaching and departing from the crosswalk) and set up to communicate with user device 110 when user device 110 is in proximity to wireless beacons 124. Wireless beacons 124 may also correspond to a sub-location/area of the crosswalk location (e.g., the aforementioned crosswalk entrances and exits, within the crosswalk travelling path, and at or nearby sidewalks approaching and departing from the crosswalk). Thus, wireless beacons 124 may be range limited to connect only with devices (e.g., user device 110) within the specified area, such as a radius around wireless beacons 124, a distance away from wireless beacons 124, and/or a signal direction for wireless beacons 124. When user device 110 enters the proximity radius for one or more of wireless beacons 124, user device 110 and the one or more of wireless beacons 124 may connect and check-in information including an identifier for user 102 and/or user device 110 may be transmitted to the connected beacons of wireless beacons 124.

Check-in module 112 may execute in the background of an operating system of user device 110 and be configured to establish connections, using communication module 118 of user device 110, with one or more of wireless beacons 124. The connection may be established with or without user input from user 102. For example, wireless beacons 124 may broadcast a token, such as a universally unique identifier (UUID), for reception by check-in module 112, as will be explained in more detail herein. Check-in module 112 may utilize communication module 118 of user device 110 to receive the token from wireless beacons 124. If check-in module 112 acknowledges the UUID as identifying wireless beacons 124 and/or crosswalk management server 130 (e.g., if check-in module 112 determines the UUID corresponds to a request to establish a communication channel and/or process and complete a check-in), check-in module 112 may transmit an identifier corresponding to user 102 and/or user device 110 back to wireless beacons 124. Check-in module 112 may utilize communication module 118 of user device 110 to communicate with wireless beacons 124 (e.g., over near field communication, Bluetooth, Bluetooth Low Energy, radio, infrared, LTE Direct, or other communication protocol). The identifier from user device 110 may include, be transmitted with, concatenated with, or otherwise bundled with the identifier received from wireless beacons 124. In other embodiments, different information may be transmitted to wireless beacons 124, such as an identifier for user 102, a name or other personal information for user 102, or other identifying information. Thus, the information transmitted to wireless beacons 124 does not need to be utilized to process and/or complete a check-in in all embodiments.

Once a connection is established with wireless beacons 124, the process may associate user 102 with the one or more of wireless beacons 124 used to connect to user device 110. For example, wireless beacons 124 may previous be registered as located at or nearby a specific area within a crosswalk location (e.g., the aforementioned crosswalk entrances and exits, within the crosswalk travelling path, and at or nearby sidewalks approaching and departing from the crosswalk). Once user device 110 connects to one or more of wireless beacons 124, the check-in information for the connection (e.g., the check-in information including an identifier and information for the check-in, such as the beacon(s) of wireless beacons 124 that user device 110 is connected to) may be transmitted to crosswalk management server 130. Crosswalk management server 130 may process the check-in information to determine if user 102 will utilize a crosswalk and a setting for a crosswalk signal device and/or road signal device based on whether user 102 will utilize the crosswalk, as will be explained in more detail herein. Thus, crosswalk management server 130 may determine the position, location, and/or path of travel for user 102 utilizing user device 110's connections with one or more of wireless beacons 124 established at specific areas of the crosswalk location. As previously discussed, in other embodiments, a check-in need not be processed and/or completed to associate user 102 with the areas of the crosswalk location. Thus, other connections and data transfers to wireless beacons 124 may be sufficient to associate user 102 with the areas, sub-areas, and/or crosswalk location.

Once a connection is established with wireless beacons 124 by check-in module 112, check-in module 112 may be utilized to transmit further information to wireless beacons 124 for use by crosswalk management server 130 in determining user 102's location, path of travel, and/or parameters for use of a crosswalk. For example, check-in module 112 may access information stored to database 116, such as user personal information (e.g., an address for a work, home, vacation location, friend, family, etc., an age of user 102, a handicap of user 102, average walking speed of the user, and/or associated user (e.g., baby, pet, elderly, etc.) travelling with user 102 or luggage/cargo carried or being pushed by user 102 including recently merchant purchases). Such information may be transmitted to crosswalk management server 130 for processing, as will be explained in more detail herein. Check-in module 112 may also interface with one or more API's for applications and/or modules executed by user device 110 to retrieve such information. Check-in module 112 may also receive information from wireless beacons 124 and/or crosswalk management server 130. Received information may correspond to crosswalk signal settings determined by crosswalk management server 130, traffic issues, street closures, and/or merchant advertisements and incentives, as will be explained in more detail herein.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking, online payments, money transfer, or other applications associated with a payment provider. As previously discussed, other applications may include mapping applications, for example, through a GPS module that may identify user 102 at a location and/or calendaring/scheduling applications, which may be utilized to determine a route user 102 is travelling. Other applications 114 may include device interfaces and other display modules that may receive input from user 102 and/or output information to user 102. For example, other applications 114 may contain software programs, executable by a processor, including a graphical user interface (GUI) configured to provide an interface to the user.

User device 110 may further include database 116 stored to a transitory and/or non-transitory memory of user device 110, which may store various applications and data and be utilized during execution of various modules of user device 110. Thus, database 116 may include, for example, identifiers such as operating system registry entries, cookies associated with check-in module 112 and/or other applications 114, identifiers associated with hardware of user device 110, or other appropriate identifiers, such as identifiers used for payment/user/device authentication or identification. Database 116 may include travel route information, calendaring information, personal information, associated users travelling with user 102, associated luggage/cargo for user 102, and/or merchant purchases for user 102 that may be utilized by crosswalk management server 130. Furthermore, database 116 may further include received information from crosswalk management server 130.

User device 110 includes at least one communication module 118 adapted to communicate with wireless beacons 124 and/or crosswalk management server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacons 124 using short range communications, such as Bluetooth Low Energy, LTE Direct, WiFi, radio frequency, infrared, Bluetooth, and near field communications.

Crosswalk signal system 120 may correspond to a system for use in providing safety signals used at a crosswalk and associated road where user and/or vehicles may traverse various paths through the crosswalk and/or road. In this regard, crosswalk signal system 120 may correspond to a single crosswalk and road or a plurality of crosswalks and/or roads. Crosswalk signal system 120 may include further specialized software and/or hardware than displayed in environment 100, such as crosswalk and/or road sensors used to manipulate one or more safety signals located at the crosswalk location(s). Crosswalk signal system 120 may include safety signaling lights that manipulate the flow of traffic and prevent unsafe traffic conditions. Crosswalk signal system 120 further includes wireless beacons utilized to provide crosswalk management utilizing connections with user devices. Crosswalk signal system 120 may also include communication modules and/or network interface components configured to communication with user device 110 and/or crosswalk management server 130 directly and/or over network 150. Thus, crosswalk signal system 120 includes crosswalk signal devices 122 and wireless beacons 124.

Crosswalk signal devices 122 may correspond to one or more traffic signals, lights, and/or signs that regulate foot and/or vehicle traffic surrounding and/or travelling on a road. Thus, crosswalk signal devices 122 may regulate crosswalk traffic across a road, street or other throughway utilized by vehicles. Crosswalk signal devices 122 may also regulate vehicle traffic travelling on the road, such as through an intersection with another road and/or exiting and entering a road. Crosswalk signal devices 122 may correspond to visual signal devices, such as traffic lights having red, yellow, and green safety signals, crosswalk signals have a hand gesture to stop and a walking person gesture to traverse a crosswalk, and/or similar visual devices. Crosswalk signal devices 122 may also include auditory devices that instruct users on traffic flow.

Wireless beacons 124 may be maintained, for example, by a service provider, town/city planner, or other entity providing crosswalk management. Wireless beacons 124 may be implemented using any appropriate hardware and software configured for wireless communication with user device 110 and/or crosswalk management server 130. For example, in one embodiment, wireless beacons 124 may be implemented as a dongle device including a hardware processor and a communication module, for example, connected to a device at a crosswalk location (e.g., a computing device having specialized hardware and/or software for management of crosswalk signal devices 122). Wireless beacons 124 may also be implemented as a device incorporated within a personal computer (PC), a smart phone, laptop computer, and/or other types of computing devices capable of transmitting and/or receiving data, such as an IPAD® from APPLE®. Wireless beacons 124 may also act as a standalone device including a processor, communication module, and/or network interface component configured to communicate with user device 110 and/or crosswalk management server 130. Although a plurality of wireless beacons are described, a single wireless beacon may be utilized at the crosswalk location.

Wireless beacons 124 may be located at a physical crosswalk location. Wireless beacons 124 of FIG. 1 contains processes, procedures, and/or applications, for example, a software program, executable by a hardware processor configured to interact with user device 110 and/or crosswalk management server 130. Thus, regardless of the implementation of wireless beacons 124, as discussed above, each of wireless beacons 124 utilize a check-in module 126 and a communication module 128. Check-in module 126 may correspond to executable processes, procedures, and/or applications with associated hardware. In other embodiments, wireless beacons 124 may include additional or different software and devices as required.

Check-in module 126 may correspond to an executable module having specialized hardware and/or software features for transmitting requests to establish a connection between a device (e.g., user device 110) and one of wireless beacons 124 transmitting the request to establish the connection. Thus, wireless beacons 124 may utilize short range wireless communications of wireless beacons 124 to transmit the requests to establish a connection, including an identifier such as a Universally Unique Identifier (UUID). If user device 110 receives a request to establish the connection with wireless beacons 124 and responds with a user device identifier (potentially including the UUID and other information necessary to effectuate a check-in of user device 110), check-in module 126 may cause wireless beacons 124 to ramp up in power and create a connection between user device 110 and wireless beacons 124.

Each of wireless beacons 124 may transmit the request to establish the connection with wireless beacons 124 as a short range wireless communication (e.g. a BLE protocol communication) including a "wake up" process for check-in module 112 of user device 110 and/or a token for wireless beacons 124. In other embodiments, the request and/or connection may utilize near field communication, radio communication, infrared communication, Bluetooth communication, or WiFi communication. Additionally, although wireless beacons 124 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacons 124 (e.g., user device 110) and establishment of a connection for data transfers.

The request may be specific to user device 110 by including information that is specific to user 102, such as a name, identifier, or user device identifier. The information specific to user 102 may be determined from a user account of user 102 or other information previously provided to crosswalk management server 130. Thus, in certain embodiments, only user device 110 will pick up and authenticate the request. After check-in module 126 receives a user device identifier from user device 110, check-in module 126 may determine user 102 is in proximity to the beacon of wireless beacons 124 connected to user device 110. The beacon of wireless beacons 124 that connected to user device 110 may pass the user device identifier to crosswalk management server 130 using check-in module 126. The identifier may be passed as check-in information, allowing crosswalk management server 130 to determine user device 110 is in proximity to the one or more of wireless beacons 124 connected to user device 110 through the connection between user device 110 and the connected beacon of wireless beacons 124, as will be discussed in more detail herein. As shown in FIG. 1, wireless beacons 124 may utilize communication module 128 of one of wireless beacons 124 to pass the identifier to crosswalk management server 130. Additionally, check-in module 126 may cause wireless beacons 124 to keep a communication channel open with user device 110 for passing additional information between user device 110 and crosswalk management server 130.

Check-in module 126 may also be utilized to request, retrieve, and/or receive information from user device 110 about user 102. For example, once a connection is established between user device 110 and one or more of wireless beacons 124, check-in module 126 may pull/receive/scrape information from user device 110, such travel routes, calendar information, and/or personal information stored to database 116 of user device 110. As previously discussed, the information may include an address for a work, home, vacation location, friend, family, etc., an age of user 102, a handicap of user 102, an average walking speed of user 102, and/or associated user travelling with user 102 or luggage/cargo carried by user 102 including recently merchant purchases. Check-in module 126 may transmit information to user device 110, such as traffic information, street closures, and/or merchant advertisements/offers nearby user 102.

In various embodiments, each of wireless beacons 124 include at least one communication module 128 adapted to communicate with user device 110 and/or crosswalk management server 130. Communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 128 may communicate with user device 110 using short range communications, such as radio frequency, infrared, Bluetooth, and near field communications.

Crosswalk management server 130 may be maintained, for example, by a service provider, which may provide crosswalk management services. Thus, crosswalk management server 130 may be maintained by a town/city entity, a service provider providing services to the town/city, or other entity. Crosswalk management server 130 includes one or more processing applications which may be configured to interact with user device 110, crosswalk signal devices 122, and/or wireless beacons 124 to provide crosswalk management services and crosswalk settings to user 102. Although only a single crosswalk management server is shown, a plurality of crosswalk management servers and/or devices may function similarly. Although crosswalk management server 130 is described as a server device, in various embodiments, crosswalk management server 130 may function as a specialized device local to or connected to crosswalk signal system 120. Thus, in certain embodiments, crosswalk management server 130 may communicate through wired or short range wireless communication with crosswalk signal system to determine settings for crosswalk signal devices 122.

Crosswalk management server 130 of FIG. 1 includes a crosswalk management module 140, a traffic flow module 132, other applications 134, a database 136, and a communication module 138. Crosswalk management module 140, traffic flow module 132, and other applications 134 may correspond to executable processes, procedures, and/or applications with associated hardware. In other embodiments, crosswalk management server 130 may include additional or different hardware and software as required.

Crosswalk management module 140 may correspond to one or more processes to execute modules and associated devices of crosswalk management server 130 to determine one or more safety signal settings for crosswalk signal devices 122 based on information received from wireless beacons 124 corresponding to connections established by one or more of wireless beacons 124 with user device 110. In this regard, crosswalk management module 140 may correspond to specialized hardware and/or software utilized by crosswalk management server 130 with wireless beacons 124 to receive check-in information having connections between user device 110 and one or more of wireless beacons 124, where the check-in information may further include an identifier used for identification of user 102 and/or user device 110. Crosswalk management module 140 may utilize communication module 138 to receive the check-in information and store the check-in information to database 136 in a non-transitory memory of crosswalk management server 130. The connection(s) between user device 110 and one or more of wireless beacons 124 may further include information identifying the connected beacon(s) of wireless beacons 124 that may be utilized by crosswalk management module 140 to determine which of wireless beacons 124 are connected to user device 110 and the locations of those beacons. Utilizing such information with information received of the proximity areas for those beacons to connect with devices, a location and/or path of travel for user 102 may be determined. For example, through connections to wireless beacons 124, a position for user 102 may be triangulated. Further, through additional connections established and ended between wireless beacons 124, a path that user 102 is travelling may be determined. Thus, crosswalk management module 140 may receive the connection information from wireless beacons 124 and determine the path/location using the connections between the user device 110 and wireless beacons 124 through one or more of the beacon(s) user device 110 connected to and/or triangulation of the user through the connected beacon(s).

Crosswalk management module 140 may further determine the location and/or path of travel for user 102 at the crosswalk location using information available about user 102 from user device 110. Thus, once user device 110 connects to one or more of wireless beacons 124, information about the user device may be accessed, received, and/or retrieved by the beacon(s). Such information may include a travel route of the user accessed from a map of the user or a planner of the user from a mapping/planner module of user device 110, a calendar having a schedule of the user (e.g., a meeting schedule and location of the meeting) from a calendar/planner module of user device 110, and/or personal information about the user (e.g., a home, work, family, friend, and/or vacation address of the user, etc.) stored to database 116 of user device 110 or utilized by another application or module of user device 110. The location and/or path of user 102 may be utilized to determine if a user will attempt to cross a crosswalk the user is approaching or located at. Thus, if user 102 is, for example, travelling North on $1^{st}$ Street, it can be assumed that user 102 may wish to cross in any street intersecting $1^{st}$ Street while travelling North to user 102's destination. The scheduling/calendar info nation may also be utilized to determine when to change a light, such as prior to user 102 arriving at street if user 102 is on a tight schedule so as to assist user 102 with arriving at a location timely and preventing user 102 from engaging in risky behavior, such as jaywalking. However, if it appears that user 102 has more time, the light may cycle through as normal with user 102 waiting for a crosswalk light to change. Weather, time of day, and/or location may affect light cycles. For example, rain, late at night, or in risky neighborhoods may cause a light to change and/or cycle more quickly than normal. Thus, crosswalk management module 140 may access various information and parameters corresponding to a crosswalk that user 102 is utilizing.

In addition to determining whether a user will cross a crosswalk, an amount of time until the user arrives at the crosswalk to cross and an amount of time the user will spend crossing the crosswalk may be determined by crosswalk management module 140. The location of the user relative to arriving at the crosswalk may determine how long until the user arrives at the crosswalk. Further, personal information received from user device 110 may be processed to determine how long until the user arrives at the cross walk and how long the user will require to utilize/cross the crosswalk. For example, crosswalk management module 140 may access an age of the user, a handicap status of the user, items and/or associated users the user may be travelling with, recent merchant purchases of the user, transportation the user is utilizing (e.g., bicycle, skateboard, etc.), or other parameter. Such information may be processed to determine relative speed of user 102, which may affect when user 102 arrives at the crosswalk and/or how long user 102 will require traversing the crosswalk.

Thus, once the location of the user, the path of the user, and/or the personal information about user 102 is determined by crosswalk management module 140 using received information (e.g., the check-in information for user device 110, connections with one or more of wireless beacons 124, and additional information communicated to the beacon from user device 110), the crosswalk management device/server may determine a setting for one or more of crosswalk signal devices 122. Such setting may correspond to a change of a crosswalk light of crosswalk signal devices 122 to allow user 102 to traverse the crosswalk, a red light of crosswalk signal devices 122 to stop traffic travelling through the crosswalk (e.g., vehicle traffic), and/or an amount of time for either the traffic light or the crosswalk light of crosswalk signal devices 122 to allow the user to travel through the crosswalk. The amount of time to allow the user to travel through the crosswalk may be determined using personal information for the user, such as an age, handicap status, and/or luggage/users with the user. Once the setting is determined, it may be transmitted to one or more of crosswalk signal devices 122 for execution, which may utilize the setting to change the light for the user. The setting may immediately change the lights, may include a countdown to change the lights at some future point, or may require detection of user 102 at the crosswalk entrance through pressure sensors and/or wireless beacons 124.

The setting may also be adjusted based on user actions by user 102. For example, user 102 may be slow traversing the crosswalk and wireless beacons 124 may still detect user 102 in the crosswalk through user device 110 even though crosswalk signal devices 122 are changing or will soon change. Thus, crosswalk management module 140 may affect, adjust, or change the setting to account for additional time for user 102. In other embodiments, user 102 may correspond to a young child or pet who runs into the crosswalk without waiting for the light to change. Thus, on detection of the child or pet in the crosswalk, crosswalk management module 140 and/or wireless beacons 124 detecting user 102 in the crosswalk may cause the lights to quickly or immediately change to provide safety to the young child. Once user 102 is detected as safely on the other side of the crosswalk (e.g., through wireless beacons 124), crosswalk management module 140 may cause crosswalk signal devices 122 to change in order to assist in the flow of traffic. Thus, the crosswalk light may change more quickly to red than in a normal situation. However, if additional users begin to arrive at the crosswalk managed using crosswalk signal devices 122, crosswalk management module 140 may determine whether to cause crosswalk signal device 122 to extend their "walk" signal or change to "don't walk"/red as required by the parameters of the users, the crosswalk, and/or traffic flow through the crosswalk.

Setting may also be adjusted based on information about surround circumstances, such as traffic and/or street closure. Traffic flow module 132 may correspond to one or more processes to execute modules and associated devices of crosswalk management server 130 to access traffic flow information, adjust settings of crosswalk signal devices 122 based on traffic flow, and/or provide traffic flow information to a merchant. In this regard, traffic flow module 132 may correspond to specialized hardware and/or software utilized by crosswalk management server 130 with crosswalk signal devices 122 to determine and utilize traffic flow information. Traffic flow information may be received by communication module 138 from a third party source, such as a traffic system or source (e.g., a news company, traffic monitoring source, etc.), and may correspond to flow patterns of pedestrians and/or vehicles on sidewalks and/or roads, as well as traffic issues (e.g., congestion, accidents, etc.) and street, road and/or entrance/exit closures (e.g., for events, maintenance, etc.). Traffic flow information may also be determined by traffic flow module 132 using connections between one or more communication devices (e.g., user device 110) and wireless beacons 124.

Traffic flow module 132 may utilize the traffic flow information to affect settings for crosswalk signal device 122. Traffic flow module 132 may route users and/or vehicles to certain travel routes, for example, around traffic accidents/congestion or to avoid street closures. Thus, traffic or street closures may route the users to certain crosswalks while preventing other crosswalks, or cause increased delay for certain crosswalks to alleviate vehicle traffic concerns. Traffic flow module 132 may also monitor and track user foot traffic utilizing wireless beacons 124 to determine traffic flows and other high traffic patterns. For example, traffic flow module 132 may determine more users utilize a certain crosswalk or travel down a certain street/sidewalk. Such determinations may also be time specific, thereby determining that a higher volume of users utilize a crosswalk or sidewalk during a certain time of the day (e.g., morning/noon/evening) or event. Such traffic patterns may be provided to nearby merchants, businesses, and/or service providers to assist such employers with business decisions.

In various embodiments, crosswalk management server 130 includes other applications 134 as may be desired in particular embodiments to provide features to crosswalk management server 130. For example, other applications 134 may include security applications for implementing server-side security features, programmatic server applications for interfacing with appropriate application programming interfaces (APIs) over network 150, or other types of applications. Other applications 134 may contain software programs, executable by a processor, including a graphical user interface (GUI), configured to provide an interface to a user.

Additionally, crosswalk management server 130 includes database 136. In various embodiments where crosswalk management server 130 allow user 102 to establish user accounts with crosswalk management server 130 that may include user information. For example, a town may allow user 102 to establish a user account or user information in database 136 that may be utilized when user device 110 connects to one or more of wireless beacons 124. Database 136 may further include check-in information having connections between user device 110 and one or more of wireless beacons 124. Database 136 may store settings and adjustments to settings for crosswalk signal devices 122 as well as traffic flow information determined by traffic flow module 132.

In various embodiments, crosswalk management server 130 includes at least one communication module 138 adapted to communicate user device 110, crosswalk signal devices 122, and/or wireless beacons 124 over network 150. In various embodiments, communication module 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
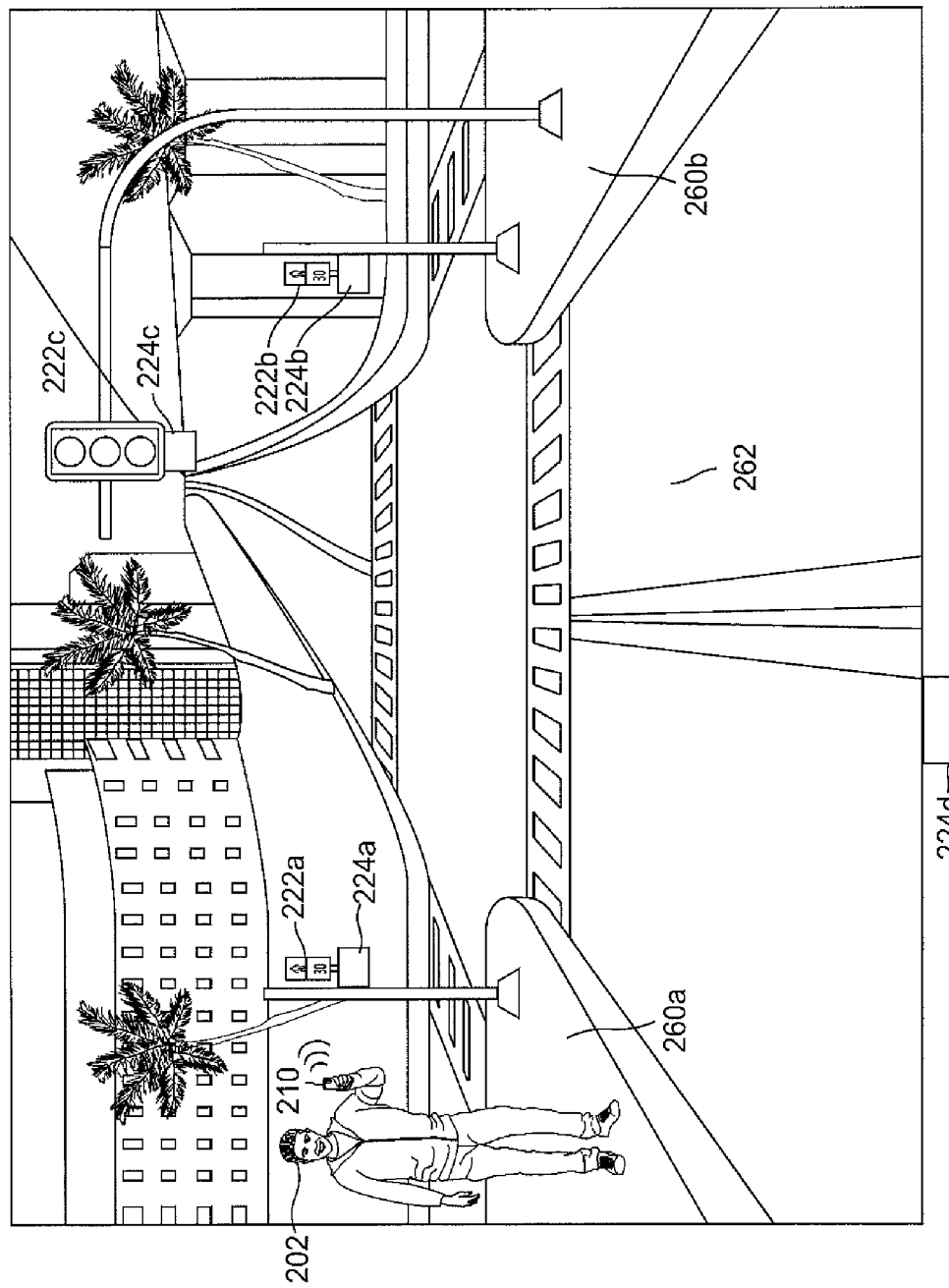
FIG. 2 is an exemplary environment displaying a wireless beacon device connecting with a user device for a user at a crosswalk location in order to provide crosswalk management to the user, according to an embodiment.

FIG. 2 is an exemplary environment displaying a wireless beacon device connecting with a user device for a user at a crosswalk location in order to provide crosswalk management to the user, according to an embodiment. Environment 200 of FIG. 2 includes a user 202 having a user device 210 corresponding generally to user 102 and user device 110, respectively, of FIG. 1. Environment 200 also includes a crosswalk signal device 222a, a crosswalk signal device 222b, and a road signal device 222c all corresponding generally to crosswalk signal devices 122 of FIG. 1. Environment 200 further includes a wireless beacon 230a, a wireless beacon 224b, a wireless beacon 224c, and a wireless beacon 224d all corresponding generally to wireless beacons 124 of FIG. 1.

Environment 200 includes a sidewalk 260a, a sidewalk 260b, and a street 262. User 202 is standing or walking along sidewalk 260a and therefore at or approaching street 262. User 202 possesses user device 210 while user 202 in on sidewalk 260a. As user 202 approaches street 262, user device 210 becomes in proximity to wireless beacon 224a at or nearby crosswalk signal 222a used for crossing street 262. When user device 210 is in proximity to wireless beacon 224a, user device 210 and wireless beacon 224a connect and user device 210 provides an identifier to wireless beacon 224a that may be utilized to establish check-in information for user 202/user device 210 with a device/server connected to wireless beacon 224a. The check-in information may include the connection between user device 210 and wireless beacon 224a so that the device/server may determine user 202 is in proximity to wireless beacon 224a (e.g., standing/walking on sidewalk 260a).

Since user 202 is detected as approaching or at street 262 and wishes to cross street 262 to sidewalk 260b (e.g., through a location/path of user 202 and/or personal information about user 202), the device/server managing crosswalk signal device 222a, crosswalk signal device 222b, and road signal device 222c may determine a setting for each of signal device 222a, crosswalk signal device 222b, and road signal device 222c. For example, if user 202 is at or approaching street 262 and wishes to cross, the device/server may cause each of signal device 222a, crosswalk signal device 222b, and road signal device 222c to change signals in order to allow user 202 to safely cross street 262 to sidewalk 260b. Thus, signal device 222a, crosswalk signal device 222b, and road signal device 222c may anticipate user 202 arriving at street 262 and change signal device 222a, crosswalk signal device 222b, and road signal device 222c so as to minimize a wait time by user 202 on sidewalk 260a.

As previously discussed, user personal information may affect the setting for signal device 222a, crosswalk signal device 222b, and road signal device 222c when user 202 is crossing street 262. For example, if user 202 is elderly or is carrying several shopping bags, user 202 may be given additional time in the setting for each of signal device 222a, crosswalk signal device 222b, and road signal device 222c to cross street 262. Moreover, wireless beacons 224b, 224c, and 224d may also cause changes/adjustments to the setting that affects signal device 222a, crosswalk signal device 222b, and road signal device 222c. As user 202 approaches wireless beacon 224b, user device 210 may check in to wireless beacon 224b corresponding to sidewalk 260b that is the destination (e.g., crosswalk exit) for user 202. Once user 202 is detected as approached and/or at sidewalk 260b through wireless beacon 224b, the setting may be adjusted for signal device 222a, crosswalk signal device 222b, and road signal device 222c so as to prevent additional users from crossing street 262 and allow vehicles to again begin using street 262. However, if user 202 is travelling slowly across street 262, user device 210 may be only connected to one or more of wireless beacons 224c and 224d and not yet connect to wireless beacon 224b. Thus, the device/server may determine that user 202 is still located on street 262. The device/server may then continue to allow crossing of street 262 using signal device 222a, crosswalk signal device 222b, and road signal device 222c so as to prevent any safety issues to user 202 and/or vehicles travelling on street 262.

Figure 3:
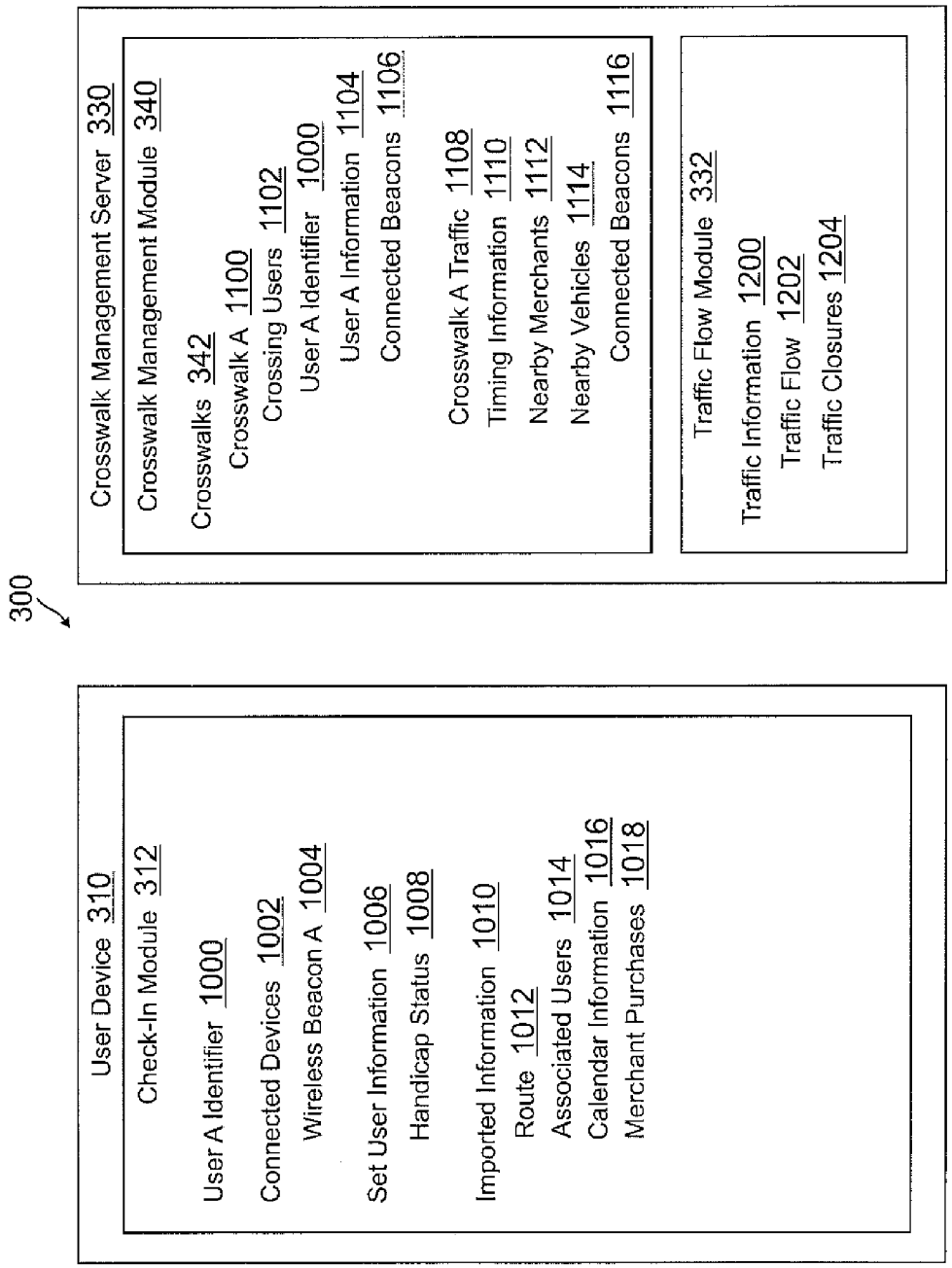
FIG. 3 is an exemplary system environment having a user device in communication crosswalk management server for providing crosswalk management to the user of the user device, according to an embodiment.

FIG. 3 is an exemplary system environment having a user device in communication crosswalk management server for providing crosswalk management to the user of the user device, according to an embodiment. Environment 300 of FIG. 3 includes a user device 310 and a crosswalk management server 330 corresponding generally to user device 110 and crosswalk management server 130, respectively, of FIG. 1.

User device 210 executes a check-in module 312 corresponding generally to the specialized hardware and/or software modules and processes described in reference to check-in module 312 of FIG. 1. Check-in module 312 accesses and/or stores a user A identifier 1000 that may be utilized in established a connection and/or check-in information for user device 310. Once a connection is established, check-in module 312 may include information of connected device 1002 that user device 310 has formed a connection with, such as wireless beacon A 1004. Check-in module 312 may also have established user information entered (e.g., using an input device of user device 310) that may be transmitted to wireless beacon A 1004 when the connection is formed with wireless beacon A 1004. For example, check-in module 312 includes set user information 1006, such as a handicap status 1008. Handicap status 1008 may be transmitted to wireless beacon A 1004 in order determine a length of time the user of user device 310 may need to cross a crosswalk. Check-in module 312 may also import information from one or more other modules, applications, and/or databases, such as imported information 1010. Imported information 1010 includes a route 1012 (e.g., from a mapping/calendar application), associated users 1014 (e.g., through user device connections, actions, and/or transactions with other users associated with the user of user device 310), calendar information 1016, and/or merchant purchases 1018 (e.g., receipts and/or transaction histories received by user device 310 when performing mobile payments to a merchant).

Crosswalk management server 330 may receive the check-in information for user device 310, such as user A identifier 1000 and information for the connection between user device 310 and wireless beacon A 1004. Crosswalk management server 330 executes a crosswalk management module 340 corresponding generally to the specialized hardware and/or software modules and processes described in reference to crosswalk management module 140 of FIG. 1. Crosswalk management module 340 may control and generate settings for one or more safety devices controlling a crosswalk. In this regard, crosswalk management module includes information for crosswalks 342, including a crosswalk A 1100 that the user of user device 310 wishes to cross. Crosswalk A 1100 thus includes information for crossing users 1102, for example, user A identifier 1000. Crossing users 1102 further includes information corresponding to each crossing user that may be utilized to determine the setting(s) for safety lights regulating crosswalk A 1100. Thus, user A identifier 1000 for crossing users 1102 is further associated with user A information 1104. User A identifier 1000 is also associated with beacons that are connected to user device 310 under connected beacons 1106. Connected beacons 1106 may be utilized to determine a location and/or path of travel for the user associated with user A identifier 1000. The information under crossing user 1102 may then be utilized to determine a setting of the safety lights associated with crosswalk A 1100 tailored to the user associated with user A identifier 1000.

Crosswalk A 1100 further includes crosswalk A traffic 1108 having information about pedestrian traffic utilizing crosswalk A 1100 and vehicle traffic travelling through crosswalk A 1100. Timing information 1110 may include information for the normal time length given to users to cross crosswalk A 1100. Further, crosswalk A 1100 may be associated with nearby merchants 1112 that may receive information for traffic flow of crosswalk A 1100 determined by crosswalk management server 330 (e.g., using a traffic flow module 332). Crosswalk A 1100 may also include information of nearby vehicles 1114 that may be connected to one or more wireless beacons at crosswalk A 1100, such as connected beacons 1116.

Crosswalk management module 340 may also utilize traffic information 1200 to may decisions on settings for safety signals for crosswalk A 1100. Crosswalk management server 330 executes a traffic flow module 332 corresponding generally to the specialized hardware and/or software modules and processes described in reference to traffic flow module 332 of FIG. 1. Traffic flow module 332 includes traffic information 1200 having traffic flow 1202 and traffic closures 1204. Traffic flow 1202 may include a flow of pedestrian and/or vehicle traffic determined from one or more wireless beacons, for example, at crosswalk A 1100. Traffic flow 1202 may also include traffic information received from a third party, such as a traffic monitoring service. Similarly, traffic closures 1204 may be determined using one or more wireless beacons and/or a third party. Traffic information 1200 may be utilized to determine a setting or adjustment to a setting for safety lights in order to properly route traffic.

Figure 4:
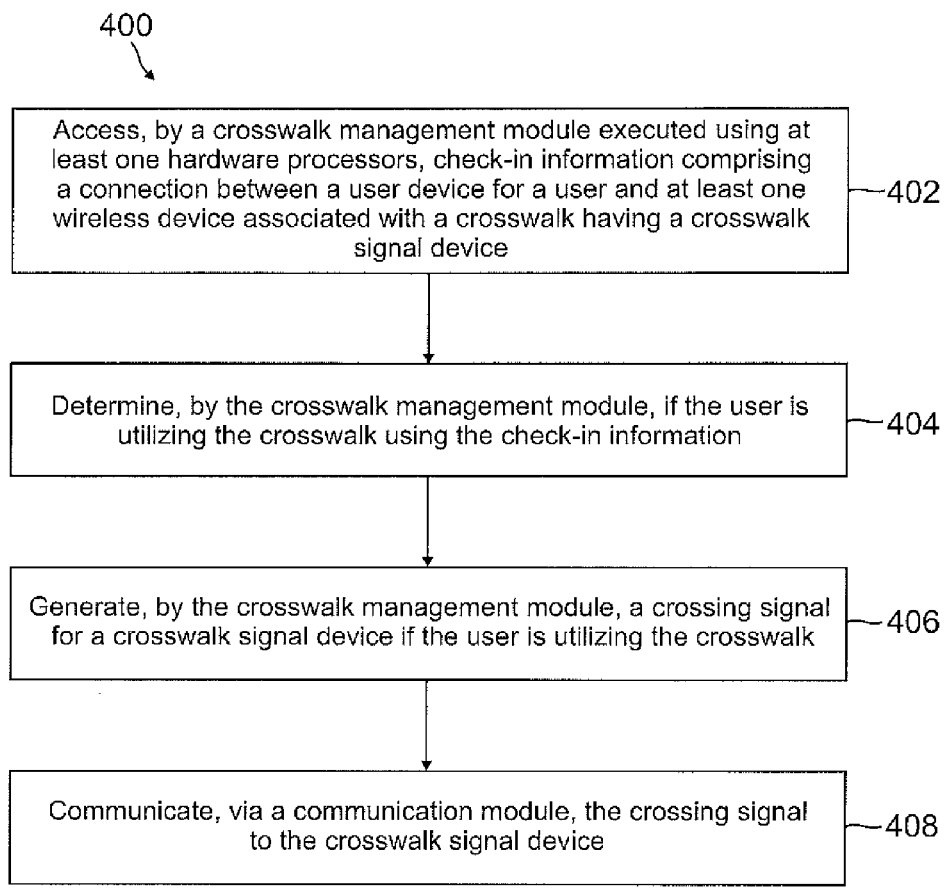
FIG. 4 is a flowchart of an exemplary process for wireless beacon devices providing crosswalk management through communication device connections, according to an embodiment.

FIG. 4 is a flowchart of an exemplary process for wireless beacon devices providing crosswalk management through communication device connections, according to an embodiment. Note that one or more steps, processes, and methods described herein may be omitted, performed in a different sequence, or combined as desired or appropriate.

At step 402, check-in information comprising a connection between a user device for a user and at least one wireless device (e.g., a wireless beacon device) associated with a crosswalk having a crosswalk signal device is accessed by a crosswalk management module executed using at least one hardware processor. The connection may use one of near field communication, radio communication, infrared communication, Bluetooth communication, Bluetooth Low Energy (BLE) communication, WiFi communication, and LTE Direct communication. The check-in information may further comprise one of a schedule for the first user and a travel route for the first user, an age of the user, and/or a handicap status of the user, as well as other information discussed herein that may affect when to change a crosswalk signal and/or how long to keep it changed. The wireless beacon may be range limited to connect to communication devices located within the road at the crosswalk location, and the crosswalk signal may regulate pedestrian traffic crossing the road.

At step 404, it is determined if the user is utilizing the crosswalk using the check-in information, for example, by a crosswalk management module. If the user is utilizing the crosswalk, at step 406, a setting for a crossing signal for a crosswalk signal device may be generated. The setting may comprise an amount of time to allow the first user to cross the road based on the handicap status, a change of the crosswalk signal to minimize a wait for the first user at the crosswalk location when crossing the road, an amount of time to allow the first user to cross the road based on the age, and/or a setting to use when adjusting a traffic signal regulating automotive traffic travelling on the road.

The setting may be communicated to a communication device for the user and/or a communication device in a vehicle traversing the road. Further, at step 408, the setting for the crossing signal may be communicated to the crosswalk signal device for use in allowing the user to cross the road. The setting may be further based on traffic information for a road corresponding to the crosswalk, such as a road closure at or nearby at least one of the road and the crosswalk. While the user is utilizing the crosswalk, second check-in information for the user may be received, wherein the second check-in information comprises a connection between the communication device and another wireless beacons. Using the second check-in information, an adjustment to the crosswalk signal may be determined (e.g., an adjustment to the setting of the crosswalk signal), such as additional time to allow the user to traverse the crosswalk.

Figure 5:
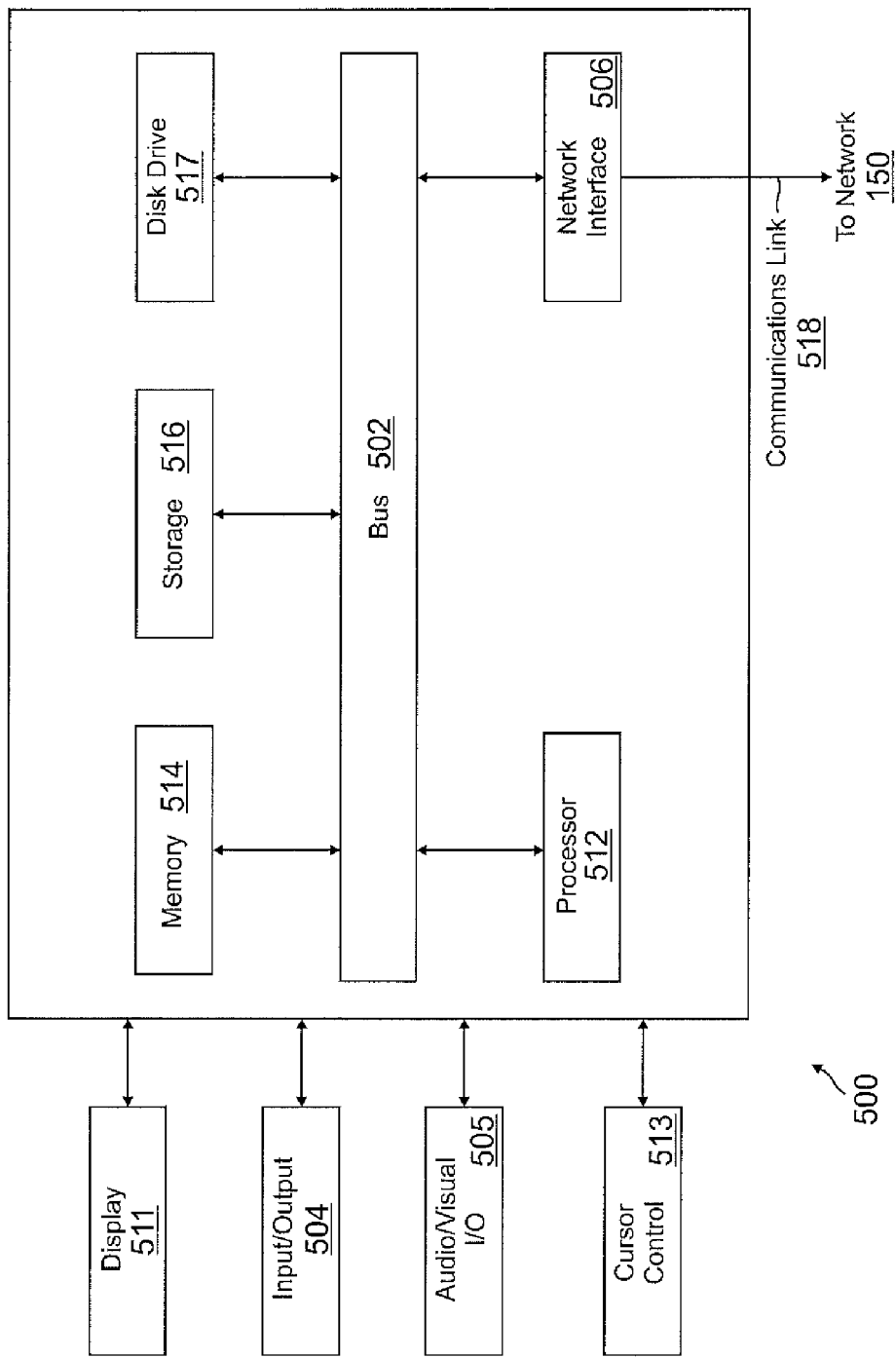
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for controlling a setting of a crosswalk signal at a crosswalk location, the system comprising:
   a non-transitory memory; and
   one or more hardware processors coupled to the non-transitory memory and configured to read instructions from the non-transitory memory to cause the system to perform operations comprising:
   receiving, at a crosswalk management server in communication with a first wireless beacon located at or near the crosswalk location, first check-in information from a first communication device based on a first connection between the first communication device associated with a first user and the first wireless beacon; wherein the first check-in information comprises at least an identifier of the first communication device for establishing the first connection with the first wireless beacon when the first communication device of the first user is in a proximity distance to the first wireless beacon;
   retrieving, at the crosswalk management server, through the first wireless beacon, scheduling information for the first user from a schedule application executing on the first communication device of the first user, wherein the scheduling information for the first user comprises an upcoming appointment and the upcoming appointment location;
   determining information about a road the first user is traversing using the crosswalk location or approaching to traverse using the crosswalk location, wherein the information about the road is determined using the first check-in information and the scheduling information;
   determining the setting for the crosswalk signal at the crosswalk location based on the first check-in information, the scheduling information, and the information about the road, wherein the setting adjusts an amount of time of the crosswalk signal at the crosswalk location based on the scheduling information; and
   communicating the setting to the crosswalk location to affect a change to the crosswalk signal at the crosswalk location.

2. The system of claim 1, wherein the first connection uses one of near field communication, radio communication, infrared communication, Bluetooth communication, Bluetooth Low Energy (BLE) communication, WiFi communication, and LTE Direct communication.

3. The system of claim 1, wherein the operations further comprise:
   communicating the setting to the first communication device.

4. The system of claim 1, wherein the first check-in information further comprises a travel route for the first user, and wherein the setting comprises a change of the crosswalk signal to minimize a wait for the first user at the crosswalk location when waiting to cross the road.

5. The system of claim 1, wherein the first check-in information further comprises status information for the first user, and wherein the setting comprises an amount of time to allow the first user to cross the road based on the status information.

6. The system of claim 5, wherein the status information comprises at least one of an age of the first user, a handicap status of the first user, at least one additional user travelling with the first user, a child or ward accompanying the first user, and an average walk speed or time of the first user.

7. The system of claim 1, wherein the first wireless beacon is range limited to connect to communication devices located within the road at the crosswalk location, wherein the crosswalk signal regulates pedestrian traffic crossing the road, and wherein the setting changes at least one of the crosswalk signal and a traffic signal regulating automotive traffic travelling on the road.

8. The system of claim 1, wherein the operations further comprise:
   receiving traffic information for at least one of the road and the users utilizing the crosswalk location; and
   determining the setting using the traffic information.

9. The system of claim 8, wherein the traffic information comprises a road closure at or nearby at least one of the road and the crosswalk location.

10. The system of claim 1, wherein the setting is further communicated to a device associated with a vehicle approaching the crosswalk location and travelling on the road.

11. The system of claim 1, wherein the operations further comprise:
   receiving second check-in information comprising at least one second connection between the first communication device and at least one second wireless beacon;

determining a location for the first user within the road using the first connection and the at least one second connection;

determining an adjustment to the setting using the location; and communicating the adjustment to the crosswalk signal.

12. The system of claim 11, wherein the adjustment provides additional time for the crosswalk signal to allow the first user to cross the road.

13. The system of claim 1, wherein the first check-in information comprises identification information for a second user travelling with the first user, and wherein the setting is further determined using the identification information.

14. The system of claim 1, wherein the operations further comprise:

receiving second check-in information comprising a second connection between a second communication device for a second user and the first wireless beacon at a time after the receiving the first check-in information;

determining an additional time to allow the second user to cross the road using the second check-in information; and communicating the additional time to the crosswalk signal.

15. A method for controlling a setting of a crosswalk signal at a crosswalk location, the method comprising:

accessing, by a crosswalk management module executed using at least one hardware processors, check-in information from a plurality of user devices based on connections between at least one wireless beacon device established at or nearby the crosswalk location and the plurality of user devices, wherein the check-in information from each of the plurality of user devices comprises at least an identifier of each of the plurality of user devices for establishing a connection with the at least one wireless beacon device when the each of the plurality of user devices are in a proximity distance to the at least one wireless beacon, wherein each of the plurality of user devices is associated with one user of the plurality of users;

retrieving, through the at least one wireless beacon device, scheduling information for the plurality of users from schedule applications executing on the plurality of user devices of the plurality of users, wherein the scheduling information comprises upcoming appointments and the upcoming appointment locations for the plurality of user devices;

determining, by the crosswalk management module, traffic information about a road the plurality of users are traversing using the crosswalk location or approaching to traverse using the crosswalk location, wherein the traffic information is determined using the check-in information and the scheduling information;

determining, by the crosswalk management module, a setting of the crosswalk signal for a crosswalk signal device at the crosswalk location based on the check-in information, the traffic information about the road, and the scheduling information, wherein the setting of the crosswalk signal adjusts an amount of time of the crosswalk signal device based on the scheduling information; and communicating, via a communication module connected to the crosswalk management module, the setting of the crosswalk signal to the crosswalk signal device at the crosswalk location to affect a change to the crosswalk signal.

16. The method of claim 15 further comprising:

determining, by the crosswalk management module, a traffic pattern using the check-in information for the plurality of users; and communicating, via the communication module, the traffic pattern to at least one merchant.

17. The method of claim 16, wherein the check-in information further comprises at least one of a travel route for at least one of the plurality of users and an address associated with at least one of the plurality of users.

18. The method of claim 15, wherein the traffic information comprises at least one of road closures, street work, street maintenance, traffic accidents, and safety alerts.

19. A non-transitory computer machine-readable medium having stored thereon machine-readable instructions executable to cause a machine to perform operations comprising:

accessing, by a crosswalk management module executed using at least one hardware processors, check-in information from a user device for a user based on a connection between at least one wireless beacon device associated with a crosswalk location having a crosswalk signal device; wherein the check-in information from the user device comprises at least an identifier of the user device for establishing the connection with the at least one wireless beacon device when the user device is in a proximity distance to the at least one wireless beacon device;

retrieving, by the cross management module, through the at least one wireless beacon, scheduling information for the user from a schedule application executing on the user device of the user, wherein the scheduling information for the user comprises an upcoming appointment and the upcoming appointment location;

determining, by the crosswalk management module, information about a road the user is traversing using the crosswalk location or approaching to traverse using the crosswalk location, wherein the information about the road is determined using the check-in information and the scheduling information;

determining, by the crosswalk management module, a setting of a crosswalk signal for the crosswalk signal device based on the check-in information, the scheduling information, and the information about the road, wherein the setting adjusts an amount of time of the crosswalk signal device based on the scheduling information; and communicating, via a communication module connected to the crosswalk management module, the crosswalk signal to the crosswalk signal device at the crosswalk location to affect a change to the crosswalk signal.

* * * * *